(12) United States Patent
Ainsworth

(10) Patent No.: US 6,792,978 B2
(45) Date of Patent: Sep. 21, 2004

(54) FUEL CELL HOSE WITH BARRIER PROPERTIES

(75) Inventor: Carol Lynn Ainsworth, Sun Prairie, WI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 162 days.

(21) Appl. No.: 10/454,115

(22) Filed: Jun. 4, 2003

(65) Prior Publication Data

US 2003/0226608 A1 Dec. 11, 2003

Related U.S. Application Data

(60) Provisional application No. 60/386,536, filed on Jun. 6, 2002.

(51) Int. Cl.[7] ............................................... F16L 11/08
(52) U.S. Cl. ........................ 138/137; 138/140; 138/141; 138/125; 138/DIG. 7
(58) Field of Search ................................ 138/137, 140, 138/141, 125, 124, DIG. 1, DIG. 7

(56) References Cited

U.S. PATENT DOCUMENTS

| | | | |
|---|---|---|---|
| 4,633,912 A | 1/1987 | Pilkington et al. | 138/132 |
| 4,842,024 A | 6/1989 | Palinchak | 138/125 |
| 6,279,615 B1 | 8/2001 | Iio | 138/137 |
| 6,345,647 B2 | 2/2002 | Niki et al. | 138/126 |
| 6,467,508 B1 * | 10/2002 | Emad et al. | 138/137 |
| 2002/0108660 A1 * | 8/2002 | Braun et al. | 138/30 |
| 2003/0121560 A1 * | 7/2003 | Morohoshi et al. | 138/137 |

FOREIGN PATENT DOCUMENTS

| | | | |
|---|---|---|---|
| EP | 0465252 | 1/1991 | |
| EP | 1072393 | 1/2001 | |
| EP | 1108597 | 6/2001 | |
| EP | 1184550 | 3/2002 | ............ F02B/43/10 |
| EP | 1197699 | 4/2002 | ............ F16L/11/03 |
| FR | 2810578 | 12/2001 | |
| JP | 0235291 | 2/1990 | ............ F16L/11/08 |
| JP | 3255290 | 11/1991 | ............ F16L/11/08 |
| JP | 1089548 | 4/1998 | ............ F16L/11/04 |
| JP | 200018440 | 1/2000 | ............ F16L/11/044 |

OTHER PUBLICATIONS

Draft of an SAE Proposed Test Procedure Dec. 16, 1999, "Method for Speciation of Fuel Losses from Polymeric Fuel System Materials".

* cited by examiner

Primary Examiner—Patrick Brinson
(74) Attorney, Agent, or Firm—Nancy T. Krawczyk

(57) ABSTRACT

The present invention is directed to a flexible hose for transporting hydrogen and oxygen gases for use in a fuel cell vehicle. The hose has a low permeation rate and will not contaminate the fuel cell system due to interactions between the hose and the transported gases. The hose has a multi-layer inner tube, a reinforcing layer, and a cover layer wherein the multi-layer inner tube is characterized by the innermost layer being formed from a liquid crystal polymer. A second low permeability layer may be present radially outward of the liquid crystal polymer.

8 Claims, 1 Drawing Sheet

FUEL CELL HOSE WITH BARRIER PROPERTIES

This application claims the benefit of Provisional Application No. 60/386,536 filed Jun. 6, 2002.

FIELD OF THE INVENTION

The present invention is directed to a hose. More particularly, the present invention is directed to a hose suitable for use on a vehicle at employs fuel cell technology for its primary power source.

BACKGROUND OF THE INVENTION

A fuel cell is an electrochemical energy conversion device that converts hydrogen and oxygen into electricity, heat, and water. The fuel cell can be recharged while power is being drawn from it. Development of a fuel cell powered engine for a next-generation vehicle has been ongoing. The electricity generated by the fuel cell can be used to power the motor, lights, and other electrical systems in a vehicle.

The proton exchange membrane (PEM) fuel cell is one possibility for use in a vehicle. The four elements of the PEM fuel cell are the anode, the cathode, the electrolyte acting as the proton exchange membrane which only conducts positively charged ions and blocks electrons, and the catalyst that facilitates the reaction of oxygen and hydrogen. Hydrogen gas enters the fuel cell on the anode side and is forced through the catalyst where it is split into two H+ ions and two electrons. The electrons are conducted through the anode where they make their way through an external circuit (doing work such as turning the motor) and return to the cathode side of the fuel cell. Oxygen gas enters the fuel cell on the cathode side of the fuel cell and is forced through the catalyst where it forms two negatively charged oxygen atoms. The oxygen atoms attract the two H+ ions through the membrane, combing with two of the electrons from the external circuit to form a water molecule.

The PEM fuel cell operates at a fairly low temperature, and in a vehicle, the hoses transporting either the hydrogen or oxygen gases operate at temperature ranges of −40° to 95° C. and an operating pressure of about 600 KPa. Due to the high permeation nature of the gases, the hose must have a very low permeation rate.

U.S. Pat. No. 6,279615 (Iio) discloses a fuel hose with an innermost resin layer formed from EVOH with an ethylene content of 35 to 50 mol % or polybutylene aromatic ester. Iio discloses that the hose may be used with a hydrogen fuel cell.

EP 1184550 discloses a hydrogen fuel hose. The hose has an innermost layer of rubber cured by an agent not containing any metal oxide or sulfur. Outward of this rubber layer is a hydrogen impermeable metallic barrier layer.

EP1 197699 discloses a hydrogen fuel hose. The hose has an inner resin layer, a thin metal layer and an outer resin layer. The inner resin layer includes at least a layer of low gas permeability and may further include a layer of low water permeability surrounded by the layer of low gas permeability. The hose may have a corrugated wall portion. The layer of low gas permeability resin is selected from the group of EVOH, PBN, PA6, PA6–66, a PA6 or PA6–66 nanocomposite, PA6T, PA9T, PA612, PA46, PPS, PES and MXD6.

SUMMARY OF THE INVENTION

The present invention is directed to a flexible hose for transporting hydrogen and oxygen gases for use in a fuel cell vehicle.

The present invention is a hose with low permeation rate and which will not contaminate the fuel cell system due to interactions between the hose and the transported gases.

In one aspect of the invention, the hose has a multi-layer inner tube, a reinforcing layer, and a cover layer wherein the multi-layer inner tube is characterized by the innermost layer being formed from a liquid crystal polymer.

BRIEF DESCRIPTION OF THE DRAWINGS

The invention will be described by way of example and with reference to the accompanying drawing in which.

DETAILED DESCRIPTION OF THE INVENTION

Figure 1:
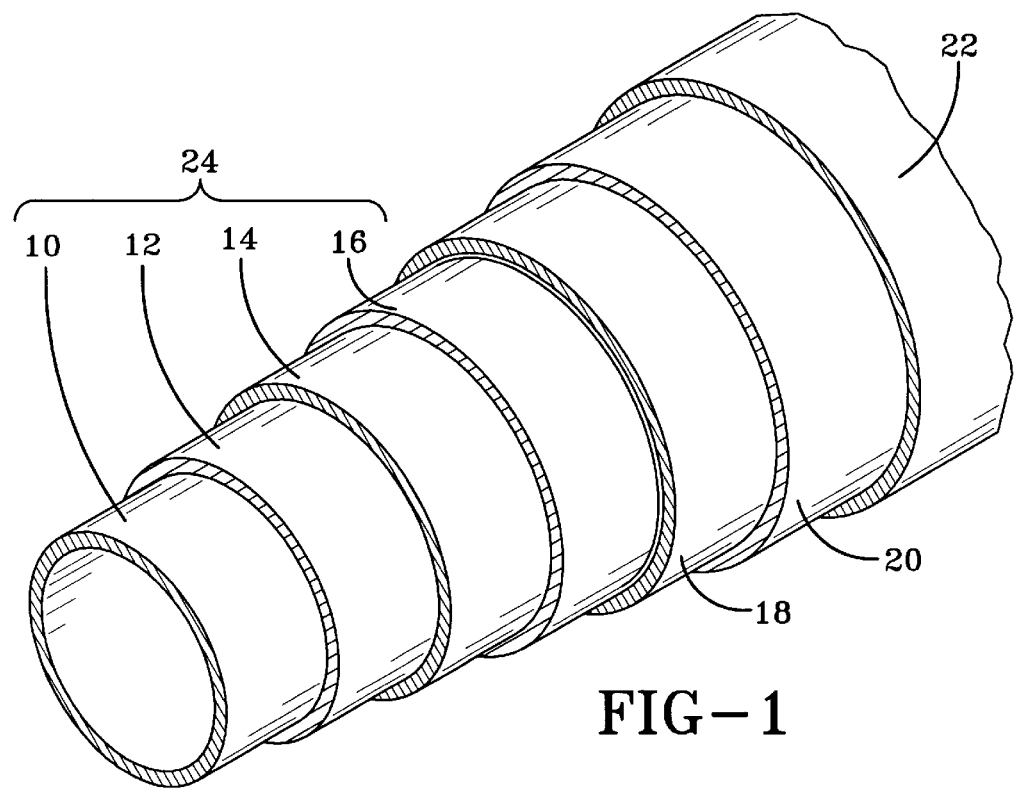
FIG. 1 is a drawing of a hose in accordance with the present invention.

As seen in FIG. 1, the hose has an inner tube 24, an intermediate layer 18, a reinforcing layer 20, and then a cover layer 22. In order to be suitable as a fuel cell hose, the inventive hose has a permeation rates of not more than $1 cm^3/hr$ for $O_2$ and not more than $50 cm^3/hr$ for $H_2$.

The inner tube is formed of at least one layer of very low permeability material. The preferred material for the innermost layer 10, of the inner tube is a liquid crystal polymer. Liquid crystal polymer has an estimated permeation rates of $0.00034 cm^3/hr$ for $O_2$ and $0.217 cm^3/hr$ for $H_2$. Any known liquid crystal with the above permeation rate is suitable. Examples include the following aromatic polyesters: XYDAR (made by Dartco), VECTRA (made by Hoeschst-Celanese), or EKONOL (made by Sumitomo Chemicals). The permeation rate can be determined in accordance with the test in the Dec. 12, 1999 SAE Speciation of Fuel Losses from Polymeric Fuel System Materials, using a 4"×4" (10.6 cm×10.16 cm) sample at an oven adjusted to a temperature of 100° C.

Radially outward of the liquid crystal polymer layer may be a secondary low permeability material layer 14. The permeation rate of the secondary material may be as low as the liquid crystal polymer, but should not be higher than the desired permeation rate of the hose. Suitable low permeability materials include polyolefin thermoplastic resins, such as high density polyethylene (HDPE), ultrahigh molecular weight polyethylene (UHMWPE), polypropylene (PP), and ethylene propylene copolymer thermoplastic resin; polyamide thermoplastic resins such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer; polyester thermoplastic resins such as polybutylene terephthalate (PBT), polyethylene terephthalate (PET), polyethylene isophthalate (PEI), PET/PEI copolymer, polyacrylate (PAR), polybutylenenaphthalate (PBN), polyoxyalkylenediimidate/polybutyrateterephthalate copolymer, and other aromatic polyesters; polynitrile thermoplastic resins such as polyacrylonitrile (PAN), polymethacrylonitrile, acrylonitrile/styrene copolymer (AS), methacrylonitrile/styrene copolymer, methacrylonitrile/styrene/butadiene copolymer; polymethacrylate thermoplastic resins such as polymethyl methacrylate (PMMA), and polyethylmethacrylate; vinyl resins such as vinyl acetate (EVA), polyvinylalcohol (PVA), vinylalcohol/ethylene copolymer (EVOH), polyvinylidene chloride (PVDC), polyvinyl chloride (PVC), vinyl chloride/ vinylidene chloride copolymer, and vinylidene chloride/ methylacrylate copolymer; cellulose thermoplastic resins such as cellulose acetate, cellulose acetate butyrate; fluoresins such as polyvinylidene fluoride (PVDF), polyvinyl fluoride (PVF), polychlorofluoroethylene (PCTFE), and tetrachloroethylene/ethylene copolymer (ETFE); and imide thermoplastic resins such as aromatic polyimide (PI).

While the liquid crystal polymer layer has a very low permeability rate, the liquid crystal polymer does not have a high hoop stress. During use, the liquid crystal polymer may develop cracks. The presence of the second low permeability material layer ensures that the permeability rate of the hose is maintained.

A tie layer 12 may be located between the two low permeability layers if required to enable the two layers to bond to one another during formation of the hose.

Radially outward of the second low permeability layer, a protective layer 16 may be placed. Such a layer is especially useful if the second low permeability layer needs to be protected during manufacturing of the hose. The protective layer is formed of a material that will bond both to the second low permeability layer and the next layer, the intermediate tie layer 18. One exemplary material is a modified nylon rubber blend, preferably a plasticized EPDM, for use with a low permeability layer of EVOH and a tie layer of EPDM.

Outward of the second low permeability layer is the intermediate tie layer 18. The intermediate layer radially outward of the inner tube is also selected based on its bonding characteristics and its flexibility. The material must be able to bond to the thermoplastic materials forming the inner tube 24 and the reinforcing material 20. Such materials include, but are not limited to chloroprene rubber (CR), NBR, ethylene propylene diene rubber (EPDM), CSM, or CPE.

The reinforcing layer 20 is formed of any known conventional fiber material used in forming hoses such as metallic fiber, polyester fiber, nylon fiber, aramid fiber, cotton fiber, or other synthetic or natural fiber, or a combination of any of these. The reinforcement layer is formed by braiding, spiraling, or knitting the fiber. The reinforcement layer is preferably spirally wrapped at angles such that flexing of the hose will not result in collapse or kinking. An angle such as 52° to 56° with respect to the centerline of the hose has been found acceptable.

The cover layer 22 is formed from any material with high moisture impermeability characteristics such as a halobutyl rubber or other suitable materials. Preferably, a halobutyl rubber such as chlorobutyl is the cover layer.

The hose is produced by first co-extruding the layers of the inner tube. The inner tube may be formed in any conventional manner, preferably the inner tube is built without the use of a continuous flexible mandrel to minimize contamination from a mandrel tube. Any tie layers are then applied, the reinforcement is applied and the cover is applied. The hose is cured, preferably by steam in an autoclave.

In manufacturing a hose in accordance with the invention, the following inner tube for the hose was constructed. The inner tube has an innermost layer of 0.003 inch gauge of liquid crystal polymer, a 0.001 inch tie layer, a 0.003 inch gauge of EVOH as the second low permeability layer, and an outer 0.023 inch gauge of nylon 6 modified with 30% EPDM. All of the layers are directly bonded to one another to make one continuous component for the hose. In this exemplary tube, the inner tube stresses will be carried mostly by the outer nylon/EPDM layer.

Figure 2:
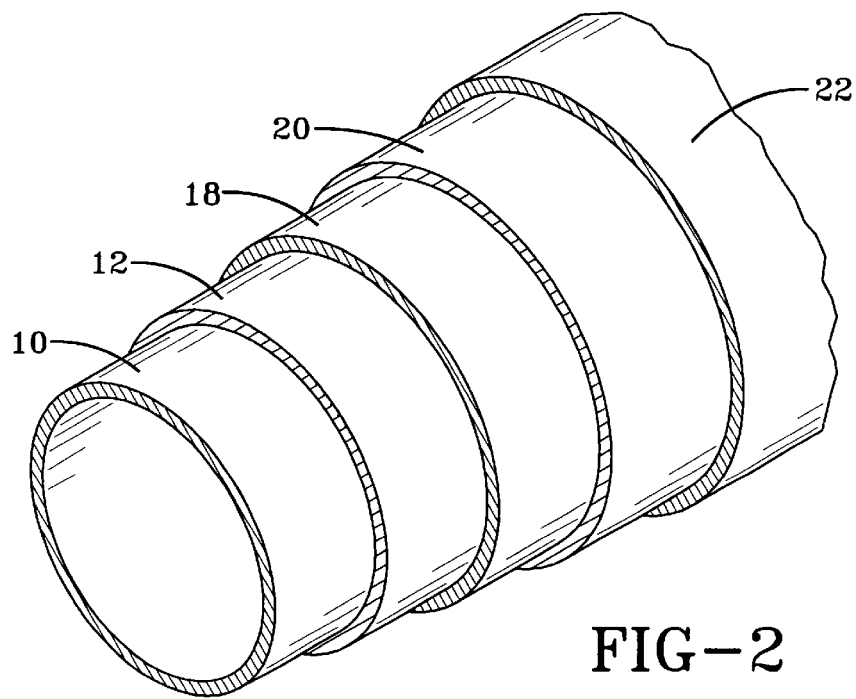
FIG. 2 is a drawing of a hose in accordance with the invention.

FIG. 2 shows an alternative hose. The inner tube has an innermost layer of liquid crystal polymer and an adjacent tie layer. Outward of the tie layer is a second tie layer, followed by the reinforcement layer and the cover layer.

In a non-illustrated alternative, there may be multiple reinforcement layers. Since the intended system pressure is 600 KPa, only a single reinforcement layer may be required.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hose for conveying a hydrogen or oxygen gas for a fuel cell vehicle, the hose comprising a multi-layer inner tube, a reinforcing layer, and a cover layer wherein the multi-layer inner tube is characterized by the innermost layer being formed from a liquid crystal polymer.

2. A hose in accordance with claim 1 wherein the inner tube has a low permeability layer radially outward of the innermost layer.

3. A hose in accordance with claim 2 wherein the low permeability layer has a permeation rate of not more than 50 $cm^3/hr$ for $H_2$.

4. A hose in accordance with claim 1 wherein the hose has a permeation rate of not more than 10 $cm^3/hr$ for hydrogen gas and not more than 1 $cm^3/hr$ for oxygen gas.

5. A hose in accordance with claim 1 wherein the cover layer is formed from a halobutyl rubber.

6. A hose for conveying a hydrogen or oxygen gas for a fuel cell vehicle, the hose comprising a multi-layer inner tube, a tie layer radially outward of the inner tube, a reinforcing layer radially outward of the tie layer, and a cover layer, wherein the multi-layer inner tube is comprised of an innermost liquid crystal polymer layer.

7. A hose in accordance with claim 6 wherein the inner tube has a low permeability layer radially outside of the innermost layer.

8. A hose in accordance with claim 7 wherein the inner tube has a tie layer between the liquid crystal polymer layer and the low permeability layer.

* * * * *